United States Patent
Tai et al.

(10) Patent No.: US 9,952,445 B2
(45) Date of Patent: Apr. 24, 2018

(54) OPTICAL IMAGE STABILIZATION SYNCHRONIZATION OF GYROSCOPE AND ACTUATOR DRIVE CIRCUIT

(71) Applicant: STMicroelectronics, Inc., Coppell, TX (US)

(72) Inventors: Chih-Hung Tai, Dallas, TX (US); Felix Kim, Plano, TX (US); Mark A. Lysinger, Carrollton, TX (US)

(73) Assignee: STMICROELECTRONICS, INC., Coppell, TX (US)

( * ) Notice: Subject to any disclaimer, the term of this patent is extended or adjusted under 35 U.S.C. 154(b) by 184 days.

(21) Appl. No.: 14/920,249

(22) Filed: Oct. 22, 2015

(65) Prior Publication Data
US 2017/0115502 A1    Apr. 27, 2017

(51) Int. Cl.
*G02B 27/64* (2006.01)

(52) U.S. Cl.
CPC ................... *G02B 27/646* (2013.01)

(58) Field of Classification Search
CPC .................................................. G02B 27/646
USPC .......................................................... 396/55
See application file for complete search history.

(56) References Cited

U.S. PATENT DOCUMENTS

| | | | |
|---|---|---|---|
| 9,681,052 B1 | 6/2017 | Lewkow | |
| 2009/0309521 A1 | 12/2009 | Yee et al. | |
| 2010/0009760 A1* | 1/2010 | Shimamura | A63F 13/428 463/43 |
| 2010/0110203 A1* | 5/2010 | Noguchi | G03B 17/00 348/208.4 |
| 2016/0341579 A1* | 11/2016 | Kimura | H03L 1/00 |

OTHER PUBLICATIONS

La Rosa et al., "Optical Image Stabilization (OIS)," published on ST.com, Dec. 2014, 26 pages.

* cited by examiner

*Primary Examiner* — Clayton E LaBalle
*Assistant Examiner* — Dennis Hancock
(74) *Attorney, Agent, or Firm* — Seed IP Law Group LLP

(57) ABSTRACT

Various embodiments provide an optical image stabilization circuit that synchronizes its gyroscope and drive circuit using gyroscope data ready signals and gyroscope reset signals. In response to a gyroscope data ready signal, the optical image stabilization circuit synchronously obtains position measurements of a camera lens when power drive signals are not transitioning from one power level to another power level, and synchronously transitions the power drive signals simultaneously with gyroscope reset signals. By synchronizing the gyroscope and the drive circuit, the gyroscope and other onboard sensing circuits are isolated from noise generated by the drive circuit.

15 Claims, 4 Drawing Sheets

OPTICAL IMAGE STABILIZATION SYNCHRONIZATION OF GYROSCOPE AND ACTUATOR DRIVE CIRCUIT

TECHNICAL FIELD

The present disclosure is directed to synchronization of a gyroscope and an actuator drive circuit of an optical image stabilization circuit.

DESCRIPTION OF THE RELATED ART

Digital cameras have progressed to smaller sizes, lower weight, and higher resolutions. A drawback to this development, however, has been the impact of minor movements on image quality. Particularly, subtle movements or vibrations while capturing an image often causes image blurring. This is especially a problem for smartphones with built-in cameras, where users capture images with outstretched arms which have a greater chance of involuntary movements. Image stabilization is widely used to minimize image blurring. Current methods of image stabilization include digital image stabilization, electronics image stabilization, and optical image stabilization. Generally, digital image stabilization and electronics image stabilization require large amounts of memory and processor resources. Optical image stabilization, on the other hand, minimizes memory and processor demands by adjusting the lens position itself. As such, optical image stabilization is ideal for portable devices, such as smartphones and tablets with built-in cameras.

In general, optical image stabilization minimizes image blurring by sensing movements of a housing and compensating for the movements by adjusting the position of the camera lens. For example, see "Optical Image Stabilization (OIS)," Rosa et al, STMicroelectronics. Optical image stabilization circuits typically include a gyroscope, a controller, and a drive circuit that includes a large current source to drive an actuator to move the camera lens.

Many optical image stabilization circuits are implemented using integrated solutions, such as a system in package or a tightly integrated printed circuit board, that have shared power and ground. Having shared power and grounds, however, causes optical image stabilization circuits, particularly their sensing components, to be susceptible to power and ground noise. For example, the large current source of the drive circuit may produce vibrations and transients on the power and ground when transitioning from one power level to another power level. Such power and ground noise may adversely affect on-board sensing components that are sensitive to power and ground noise, such as the gyroscope. Ideally, any noise generated by the drive circuit should not disturb the onboard sensing circuits of an optical image stabilization circuit.

BRIEF SUMMARY

The present disclosure provides an optical image stabilization circuit that synchronizes its gyroscope and drive circuit.

According to one embodiment, a housing includes a camera lens, an actuator to move the lens, a position sensor, and an optical image stabilization circuit having a gyroscope, a drive circuit, and a controller. The optical image stabilization circuit uses gyroscope data ready signals and gyroscope reset signals to synchronize the gyroscope and the drive circuit. In response to a gyroscope data ready signal, the optical image stabilization circuit synchronously obtains position measurements of a camera lens when power drive signals are not transitioning from one power level to another power level. By synchronizing the gyroscope sensing cycle, the position sensing timing and the power drive signal with each other, the gyroscope device and other onboard sensing circuits are isolated from noise generated by the drive circuit. This ensures that accurate gyroscope and position measurements are obtained.

The optical image stabilization circuit disclosed herein results in reliable and accurate measurements from the gyroscope and other onboard sensing circuits that are sensitive to noise.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

DETAILED DESCRIPTION

Figure 1A:
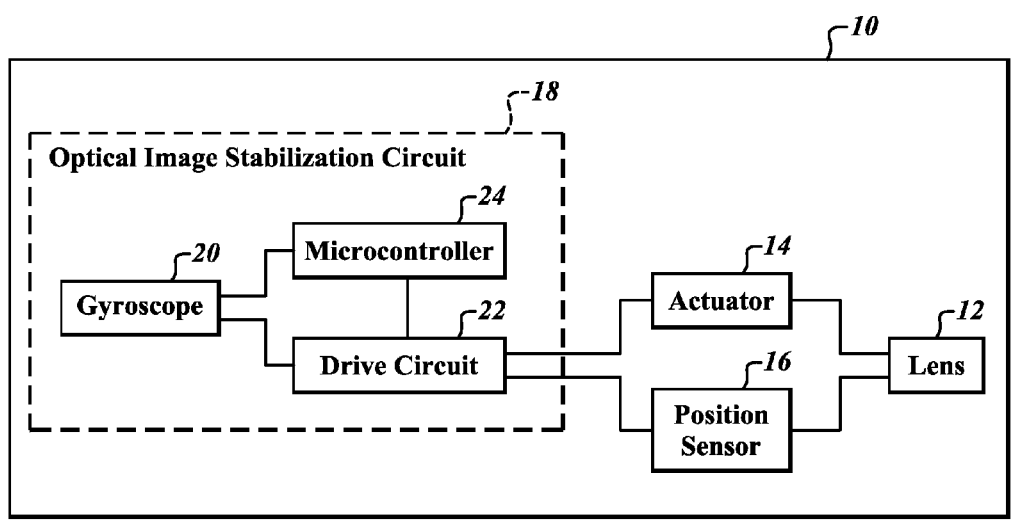
FIG. 1A is a block diagram illustrating an example of a housing including an optical image stabilization circuit according to one embodiment as disclosed herein.

In the following description, certain specific details are set forth in order to provide a thorough understanding of various embodiments of the disclosure. However, one skilled in the art will understand that the disclosure may be practiced without these specific details. In some instances, well-known details associated with optical image stabilization have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

FIG. 1A is a block diagram illustrating an example of a housing 10 according to principles disclosed herein. A camera lens 12, an actuator 14, a position sensor 16, and an optical image stabilization circuit 18 are positioned within the housing 10. The optical image stabilization circuit 18 includes a gyroscope 20, a drive circuit 22, and a microcontroller 24. In another embodiment, the optical image stabilization circuit 18 also includes an analog to digital converter to facilitate communication between the drive circuit 22 and the microcontroller 24.

The housing 10 may be any device that includes a camera. For example, the housing 10 may be a smartphone, a tablet, a digital camera, or a portable computer with a built-in camera.

The actuator 14 is coupled to the lens 12 and the drive circuit 22. The actuator 14 is configured to move the lens 12 in response to a power drive signal from the drive circuit 22. The actuator 14 may be based upon a variety of different technologies, such as adaptive liquid lenses, shape memory alloys, or piezo-electric motors. In a preferred embodiment, the actuator 14 is based on a voice coil motor.

The position sensor 16 is coupled to the lens 12 and the drive circuit 22. The position sensor 16 is configured to measure a position of the lens 12 and provide position data of the position of the lens 12 to the drive circuit 22. The position sensor 16 may be any type of sensor configured to detect movements of the lens 12. For example, the position sensor 16 may include photo sensors or hall sensors. In another embodiment, the position sensor 16 is coupled to the microcontroller 24 and provides position data directly to the microcontroller 24.

The optical image stabilization circuit 18 is coupled to the actuator 14 and the position sensor 16. As will be discussed in further detail with respect to FIGS. 2-3, the optical image stabilization circuit 18 performs an image stabilization process to minimize the impact of movements or vibrations inflicted upon the housing 10. As previously stated, the optical image stabilization circuit 18 includes the gyroscope 20, the drive circuit 22, and the microcontroller 24.

The gyroscope 20 is coupled to the microcontroller 24 and the drive circuit 22. The gyroscope 20 is configured to detect movements of the housing 10 relative to the object photographed, whose position should remain relatively constant. For example, if the housing 10 is a smartphone having the lens 12, the gyroscope 20 detects the movements of the smartphone when the user is capturing an image by taking a picture. The gyroscope 20 will sense then output any movement, such as angular rates along lateral, vertical, and longitudinal axes, of the housing 10 to the microcontroller 24. In addition, the gyroscope 20 is configured to output gyroscope data ready signals and gyroscope reset signals to the drive circuit 22. A gyroscope data ready signal indicates that movement data is ready to be processed by the microcontroller 24, and a gyroscope reset signal indicates that the gyroscope 20 is in a non-measuring state.

The drive circuit 22 is coupled to the gyroscope 20, the position sensor 16, the microcontroller 24, and the actuator 14. As previously discussed, the drive circuit 22 is configured to receive gyroscope data ready and reset signals from the gyroscope 20, and receive position data of the position of the lens 12 from the position sensor 16. The drive circuit 22 is also configured to provide a power drive signal to the actuator 14 to move the lens 12. The power drive signal to the actuator 14 may include a plurality of transitions from one power level to another power level. For example, the power drive signal may generate a standard pulse-width modulation. In a preferred embodiment, the drive circuit 22 provides a multi-state pulse-width modulation signal that can have any number of different values, duty cycles, and frequencies. In addition, the drive circuit 22 is configured to output a control cycle start signal to the microcontroller 24 to notify the microcontroller 24 that a control cycle, as will be discussed with respect to FIGS. 2-3, will begin.

The microcontroller 24 is coupled to the gyroscope 20 and the drive circuit 22. The microcontroller 24 is configured to receive a control cycle start signal from the drive circuit 22 and subsequently calculate power drive signal data to generate power drive signals. Particularly, the microcontroller 24 obtains movement data of the movement of the housing 10 from the gyroscope 20 and position data of the position of the lens 12 from the drive circuit 22. The microcontroller 24 then calculates power drive signal data based on the movement data and the position data. The power drive signal data is used to generate power drive signals to compensate for any movements and vibrations of the housing 10. For example, the power drive signal data may provide the frequency, timing of transitions, and amplitudes of power drive signals. The microcontroller 24 provides the power drive signal data to the drive circuit 22, which then provides a power drive signal based on the power drive signal data to the actuator 14 to move or adjust the lens 12 accordingly. The calculation of power drive signal data will be discussed in further detail with respect to FIGS. 2-3. In another embodiment, the position sensor 16 is also coupled to the microcontroller 24 and provides position data directly to the microcontroller 24.

It should be noted that although only one drive circuit and one actuator are shown in FIG. 1A, the housing 10 may include any number of drive circuits and actuators. In one embodiment, three of each is provided.

Figure 1B:
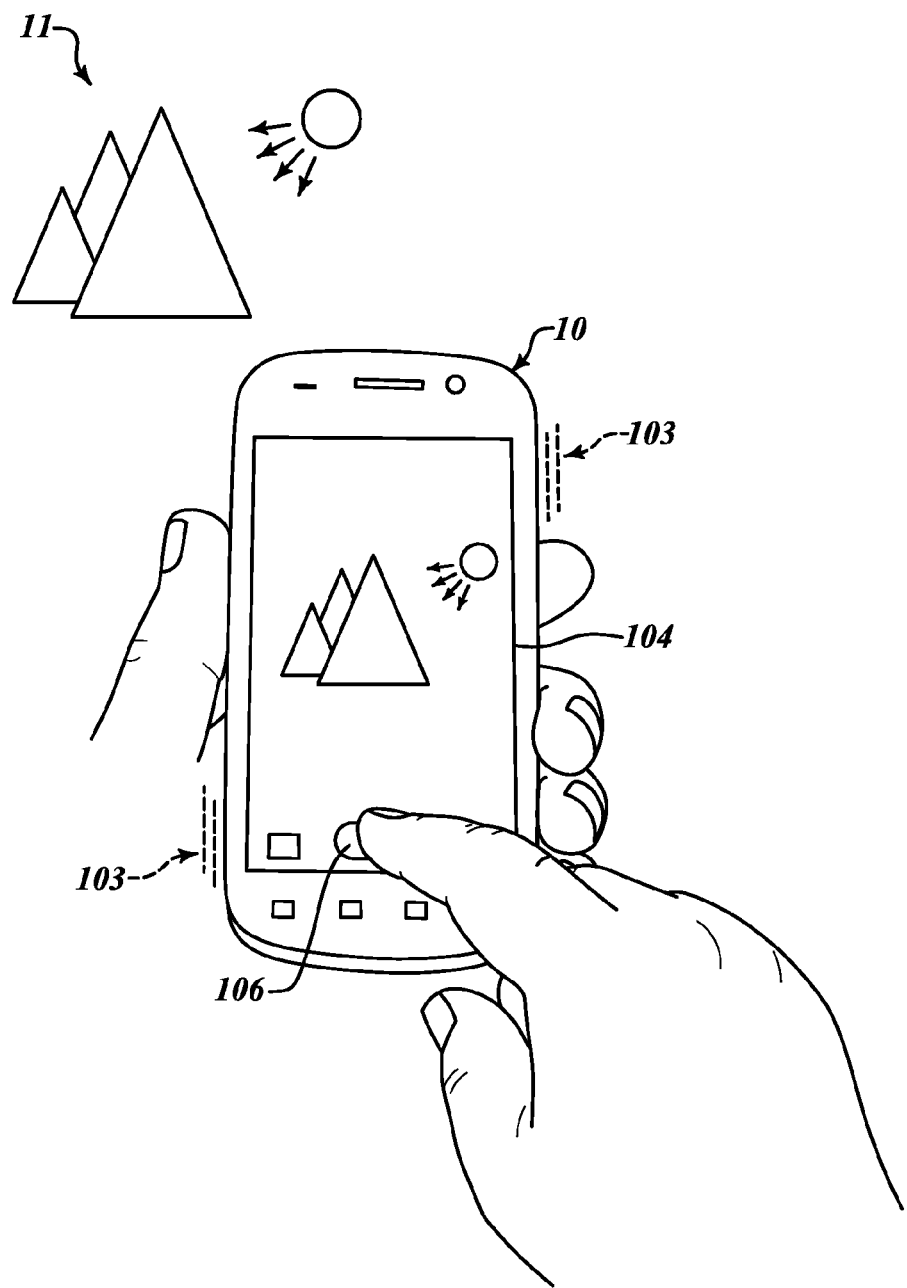
FIG. 1B shows an example camera undergoing movement and correction according to embodiments disclosed herein.

FIG. 1B illustrates one physical embodiment of use of the circuit and compensation as disclosed herein. As shown in FIG. 1B, the lens 12 is within a smartphone housing 10. Most smartphones today have sophisticated cameras. In addition, most smartphones today include gyroscopes, accelerometers, and various other sensors to sense movement of the smartphone. Within the housing 10 of the smartphone are contained all of the elements as shown in FIG. 1A, namely, the gyroscope 20, the microcontroller 24, the drive circuit 22, the lens 12 together with position sensors and actuators. These are not shown in FIG. 1B because they are inside the housing 10. The camera is pointed at a scene 11, which the user is taking a picture of by pressing on button 106. When the user's finger presses button 106 to take a picture, the housing 10 moves with a slight wiggle, as indicated by movement lines 103. This causes the camera, as well as the lens, to move. Under normal conditions, the movement of the housing 10, which contains the camera and the lens 12, occurs simultaneously with taking a picture and will cause the picture to be blurry. However, the picture of scene 11 shows up clear on display 104 because it contains the structure shown in FIG. 1A. Namely, when the camera moves while the user is pressing the button 106, the gyroscope 20 senses the movement and a power drive signal is sent, via the drive circuit 22, to the actuator 14 to move the lens 12 opposite to the movement of the housing 10. Since the movement of the lens 12 counteracts the movement of the housing 10, the picture as shown on the display 104 is clear. The operation of the optical image stabilization circuit 18, the actuator 14, the position sensor 16, and the lens 12, as further explained elsewhere herein, allows a clear image of scene 11 to be taken, even though the camera is moving, as shown by the movement lines 103, at the exact instant the camera is taking a picture.

Figure 2:
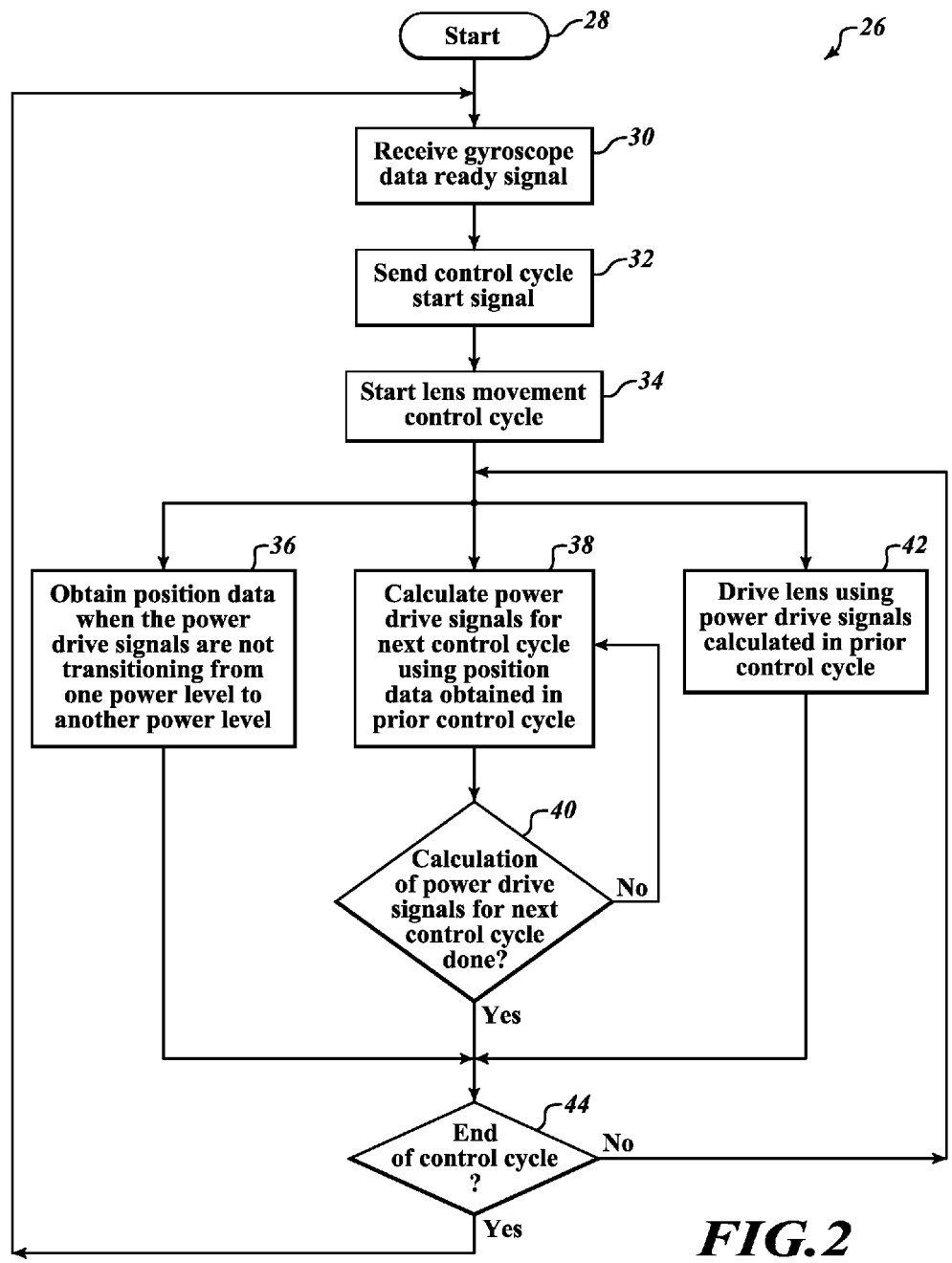
FIG. 2 is a flow diagram illustrating an example of a process for an optical image stabilization circuit according to one embodiment as disclosed herein.
Figure 3:
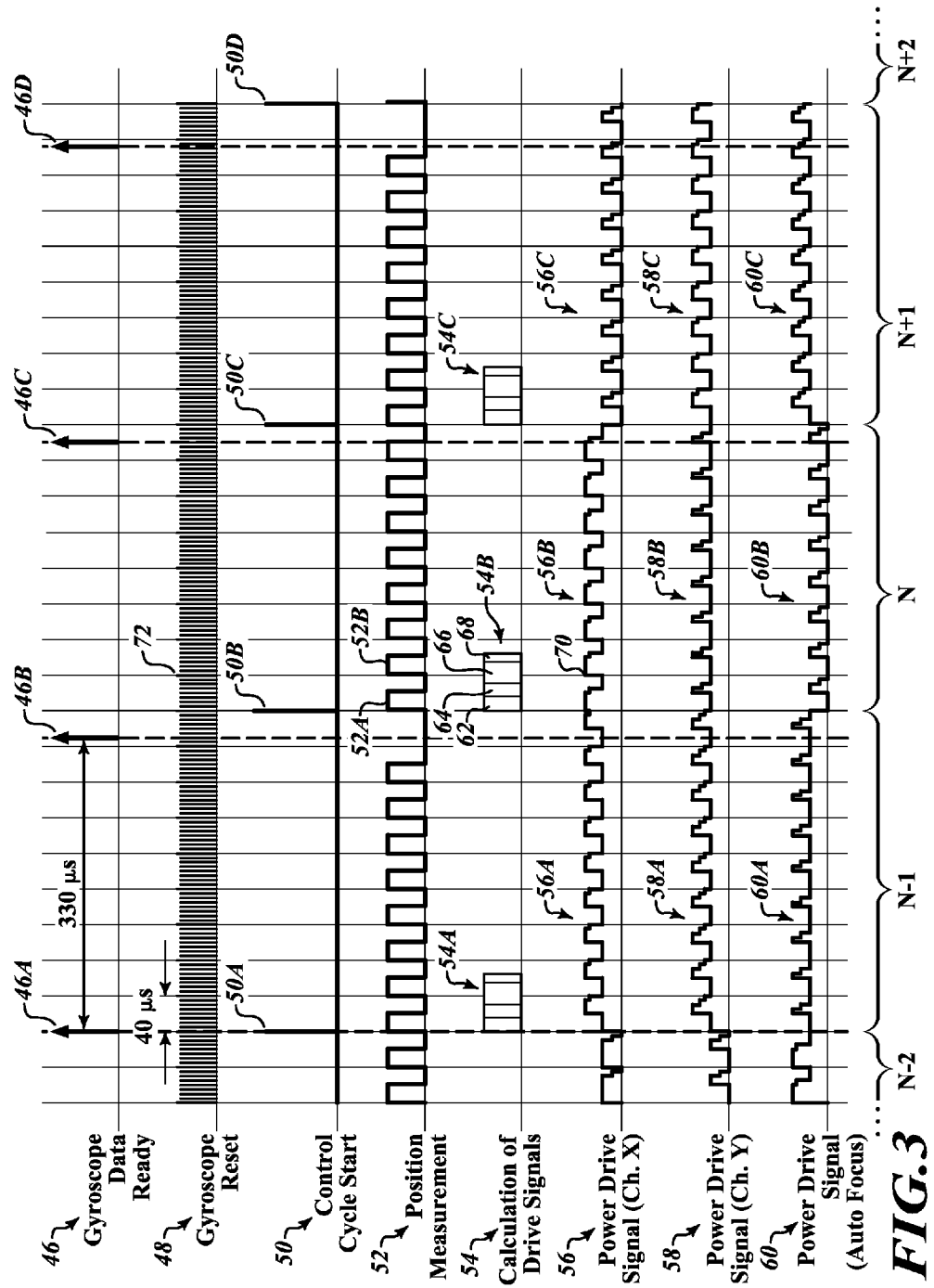
FIG. 3 is a diagram illustrating a plurality of wave forms for a plurality of lens movement control cycles of an optical image stabilization circuit according to one embodiment as disclosed herein.

FIG. 2 is a flow diagram illustrating an example of a process 26 for the optical image stabilization circuit 18 according to principles disclosed herein. It is beneficial to review the steps of FIG. 2 simultaneously with the plurality of wave forms of FIG. 3. FIG. 3 is a diagram illustrating a plurality of wave forms for a plurality of lens movement control cycles N−2, N−1, N, N+1, and N+2 of the optical image stabilization circuit 18 according to principles disclosed herein. The wave forms include gyroscope data ready signals 46, gyroscope reset signals 48, control cycle start signals 50, position measurements 52, calculation of power drive signal calculations 54, and power drive signals 56, 58, and 60. Each of the wave forms of FIG. 3 will be discussed in further detail with respect to FIG. 2.

At step 28 of FIG. 2, the process 26 begins. In a subsequent step 30, the drive circuit 22 receives a gyroscope data ready signal from the gyroscope 20. For example, as shown in FIG. 3, the drive circuit 22 receives gyroscope data ready signals 46A, 46B, 46C, or 46D from the gyroscope 20. A gyroscope data ready signal indicates that movement data is ready to be processed by the microcontroller 24.

In a preferred embodiment, the frequency of gyroscope data ready signals is programmable. For example, the gyroscope data ready signals may be programmed to have a period of 220 μs, 330 μs, and 440 μs. In the embodiment shown in FIG. 3, gyroscope data ready signals 46 have a programmed period of 330 μs.

The drive circuit 22 also receives gyroscope reset signals from the gyroscope 20. The gyroscope reset signals are received throughout the process 26. For example, as shown in FIG. 3, the drive circuit 22 receives gyroscope reset signals 48 from the gyroscope 20. Each gyroscope reset signal indicates that the gyroscope is in a non-measuring state for that brief moment in time. Particularly, the gyroscope 20 is not detecting any movements inflicted upon the housing 10 during the reset period. The length of a gyroscope reset signal may be brief, for example, 0.5 μs or 0.05 μs.

In a preferred embodiment, the gyroscope reset signals have a known frequency. In the embodiment shown in FIG. 3, the gyroscope reset signals 48 have a known period of 5 μs. If the reset period is 5 μs, the gyroscope 20, for example, will be sensing data for 4.5 μs, and then will stop sensing and be ready to output the data for 0.5 μs at the end of the gyroscope cycle. The gyroscope cycle will then repeat itself. The gyroscope cycle length and the data sending time can be any selected amount of time, such as 5 μs with 0.3 μs, 0.5 μs, or 1.0 μs, etc. data sending time. As will be discussed in further detail with respect to step 42, power drive signals are synchronized with the gyroscope reset signals. Further, in one embodiment, the frequency of power drive signals are tracked by counting the gyroscope reset signals.

In step 32, the drive circuit 22 sends a control cycle start signal to the microcontroller 24. For example, as shown in FIG. 3, the drive circuit 22 sends control cycle start signals 50A, 50B, 50C, or 50D to the microcontroller 24. Each control cycle start signal notifies the microcontroller 24 that a control cycle is ready to begin. For instance, control cycle start signal 50A notifies the microcontroller 24 that control cycle N−1 will begin, control cycle start signal 50B notifies the microcontroller 24 that control cycle N will begin, control cycle start signal 50C notifies the microcontroller 24 that control cycle N+1 will begin, and control cycle start signal 50D notifies the microcontroller 24 that control cycle N+2 will begin.

After the drive circuit 22 sends a control cycle start signal to the microcontroller 24, a lens movement control cycle begins in step 34. That is, a control cycle begins in response to the drive circuit 22 receiving a gyroscope data ready signal in step 30 and sending a control cycle start signal to the microcontroller 24 in step 32. For example, in the embodiment shown in FIG. 3, control cycle N−1 starts subsequent to gyroscope data ready signal 46A and control cycle start signal 50A, control cycle N starts subsequent to gyroscope data ready signal 46B and control cycle start signal 50B, control cycle N+1 starts subsequent to gyroscope data ready signal 46C and control cycle start signal 50C, and control cycle N+2 starts subsequent to gyroscope data ready signal 46D and control cycle start signal 50D. Once a control cycle begins in step 34, steps 36, 38, and 42 are performed concurrently. As will be discussed in further detail with respect to step 44, a control cycle may have any period length.

In a preferred embodiment, steps 38 and 42 are performed immediately upon a control cycle starting in step 34. Namely, the microcontroller 24 begins calculating power drive signals in step 38 and the drive circuit 22 drives the actuator 14 in step 42. However, step 36 is performed after a resting period, such as 1-3 μs, to allow any vibrations or transients of power drive signals from that or a previous control cycle to stabilize. That is, positions measurements in step 36 are started a short time after a control cycle is started in step 34 to allow noise generated by a previous power drive signal to settle. For example, in the embodiment shown in FIG. 3, power drive signals 56B, 58B, and 60B and calculation 54B are immediately started after the control cycle start signal 50B, which is subsequent to the gyroscope data ready signal 46B. Then, after 1-3 μs, the drive circuit 22 obtains a position measurement during measurement interval 52A of the position measurement signal 52.

In step 36, the drive circuit 22 obtains position data of the position of the lens 12 from the position sensor 16. In the embodiment shown in FIG. 3, position measurements are obtained when the position measurement signal 52 is at a high signal level. For example, position measurements are obtained from the position sensor 16 during measurement intervals 52A and 52B. The position data will be used for a calculation of power drive signals in the next control cycle. For instance, referring to control cycle N of FIG. 3, position data obtained during the measurement interval 52A will be used for calculation 54C during control cycle N+1.

The obtaining of position data is synchronized with power drive signals to not be during a transition from one power level to another power level. In other words, position data is obtained when power drive signals are at a constant power level. For example, position data may be obtained prior to or subsequent to a power drive signal transitioning from a first power level to a second power level. In the embodiment shown in FIG. 3, the measurement intervals, or high signal levels, of the position measurement signal 52 are synchronized to not be during any of the transitions of power drive signals 56, 58, and 60. By obtaining position data synchronously with the power drive signals, position measurements will not be adversely affected by any noise generated by the drive circuit 22. This ensures that accurate position measurements are obtained.

In a preferred embodiment, as will be discussed in further detail with respect to step 42, each of the power drive signals is a multi-state pulse-width modulation signal that can have any number of different values, duty cycles, and frequencies. As such, the power drive signals may be generated to have known frequencies and to not have transitions during certain portions of each period. For example, in the embodiment shown in FIG. 3, power drive signals 56, 58, and 60 are created to have periods of 40 μs with no transitions during the first 20 μs of each period. As a result, in step 36, position data may be obtained during the first 20 μs of each period. It should be noted that although the measurement intervals, or high signal levels, of the position measurement signal 52 seems to be shown to overlap the exact start of each period of the power drive signals 56, 58, and 60 as it transitions from one cycle to another, position data sensing are a short time after, such as 1-3 μs, the power drive signal starts its cycle so that position data is not sensed at the starting transition of a power drive pulse. The position data may be obtained during any portion of power drive signals in which there are no transitions from one power level to another power level. For example, the position data can be obtained during the second half of each cycle of the drive signal and not during the first half.

In step 38, power drive signals for a next control cycle are calculated by the microcontroller 24 using position data obtained in a prior control cycle. For example, referring to control cycle N of FIG. 3, calculation 54B is performed to determine power drive signals 56C, 58C, and 60C of control cycle N+1, and uses position data obtained in control cycle N−1. The calculation of power drive signals includes receiving movement data from the gyroscope 20, receiving position data from a prior control cycle from the drive circuit 22, calculating power drive signals based on the movement data and the position data to compensate for any movements of the housing 10, and providing power drive signal data to the drive circuit 22. For instance, again referring to control cycle N of FIG. 3, the microcontroller 24 receives movement data from the gyroscope 20 during time 62, receives position data obtained in control cycle N−1 from the drive circuit 22 during time 64, calculates power drive signals 56C, 58C, and 60C to compensate for movements of the housing 10 during time 66, and provides power drive signal data to the drive circuit 22 during time 68 to be used in the next cycle N+1. As will be discussed in further detail with respect to step 42, the power drive signal data is then used to generate power drive signals during control cycle N+1.

In step 40, it is determined whether the calculation of the power drive signals in step 38 is completed. For instance, referring to control cycle N of FIG. 3, it is determined whether calculation 54B is completed. If the calculation of the power drive signals have not completed, the process 26 returns to step 38. If the calculation of the power drive signals is completed, the process 26 moves to step 44 and waits until it is the end of the control cycle.

In step 42, the drive circuit 22 drives the actuator 14 for selected channels to move or adjust the lens 12. The drive circuit 22 uses the power drive signals calculated in a prior control cycle. For example, referring to control cycle N of FIG. 3, the drive circuit 22 generates power drive signal 56B to drive the actuator 14 along an X-axis channel, power drive signal 58B to drive the actuator 14 along a Y-axis channel, and power drive signal 60B to drive an auto focus channel of the lens 12 during control cycle N. The power drive signals 56B, 58B, and 60B are generated based on power drive signal data calculated during calculation period 54A. Based on the power drive signals, the actuator 14 adjusts the lens 12 accordingly. It should be noted that although only three power drive signals are shown in FIG. 3, any number of power drive signals may be generated to adjust the lens 12.

Power drive signals 56, 58, and 60 are examples of any one of different power drive signals that can be generated. For example, in one embodiment, power drive signals are standard pulse-width modulation signals, each having high (i.e., 1) and low (i.e., 0) voltage levels with a certain duty cycle or frequency. In a preferred embodiment, power drive signals are multi-state pulse-width modulation signals that can have more than a dozen different voltage levels, duty cycles, and frequencies. For instance, see U.S. patent application Ser. No. 14/976,924, filed on Dec. 21, 2015. In contrast to a standard pulse-width modulation signal in which there are only two voltage levels (high and low), a multi-state pulse-width modulation signal may have voltage levels of 1, ½, ⅓, ¼, or some other value less than the full voltage level and greater than the lowest voltage level and the width of each pulse within a cycle can vary greatly.

In a preferred embodiment, power drive signals are synchronized with gyroscope reset signals. Particularly, each power drive signal is generated to have any transitions from one power level to another power level to occur concurrently with a gyroscope reset signal. For example, in the embodiment shown in FIG. 3, transition 70 of power drive signal 56B is synchronized to be with gyroscope reset signal 72. By synchronizing the transitions of the power drive signals with the gyroscope reset signals, the gyroscope signal will be isolated from any noise generated by the drive circuit 22.

In a preferred embodiment, the frequency of the power drive signals are selected to be above the audio frequency, which is approximately 20 kHz. In the embodiment shown in FIG. 3, the power drive signals 56, 58, and 60 have a frequency of 25 kHz or a period of 40 μs.

In one embodiment, the frequency of the power drive signals are tracked by counting the gyroscope reset signals. For example, in the embodiment shown in FIG. 3, the 40 μs periods of the power drive signals 56, 58, and 60 are determined by counting eight of the gyroscope reset signals 48, which has a period of 5 μs.

After steps 36, 38, 40, 42 have completed, the process 26 moves to step 44. In step 44, it is determined whether it is the end of the lens movement control cycle that was started in step 34. A control cycle may have any period length that begins simultaneous or subsequent to a control cycle start signal and ends simultaneous or prior to a next control cycle start signal.

In a preferred embodiment, a control cycle has a period starting in response to a control cycle start signal, such as control cycle start signal 50B, and ending when in response to a subsequent control cycle start signal is received, such as control cycle start signal 50C. As a result, the number of position measurements and length of power drive signals can be maximized. For example, in the embodiment shown in FIG. 3, control cycle N has eight position measurements and eight cycles of power drive signals 56B, 58B, and 60B throughout the entire length of control cycle N. By having numerous position measurements in each control cycle, calculation of drive signals for the next control cycle may be based on multiple position measurements. For example, calculation 54C of control cycle N+1 may use a median or mean of the eight position measurements obtained during control cycle N. It would also be possible, of course, to have one or two position sensor measurements each control cycle, but doing so would reduce the quality of the data.

If it is the end of the control cycle, the process 26 returns prior to step 30. For example, when control cycle N ends, the process returns and moves to step 30 when gyroscope data ready signal 46C is received.

If it is not the end of the control cycle, the process 26 returns to perform steps 36 and 42. Upon returning to step 36, position data is obtained again when the power drive signals are not transitioning from one power level to another power level. For example, referring to control cycle N of FIG. 3, position data is obtained from the position sensor 16 during measurement interval 52B of the position measurement signal 52. Upon returning to step 42, the drive circuit continues to drive the lens using power drive signals calculated in the prior control cycle. For example, again referring to control cycle N of FIG. 3, the drive circuit 22 continues to generate power drive signals 56B, 58B, and 60B. As discussed with respect to step 40, after it is determined that the calculation of the power drive signals is completed in step 40, the process 26 moves to step 44 and waits until it is the end of the control cycle. Step 38 is not performed again until the next control cycle. For instance, once calculation 54B is completed, calculation 54C is not performed until control cycle N+1 starts.

The optical image stabilization circuit 18 disclosed herein results in reliable and accurate movement data from the gyroscope 20 and position data from the position sensor 16.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of driving a lens for movement relative to a camera housing in which the lens is located, the method comprising:
   receiving a reset signal from a gyroscope that is positioned within the camera housing, the reset signal being active indicating that the gyroscope is in a non-measuring state;
   outputting a power drive signal at a first power level to drive an actuator that moves the lens;
   transitioning, concurrently with the reset signal being active, the power level of the power drive signal from the first power level to a second power level;
   outputting the power drive signal at the second power level; and
   obtaining position data of a position of the lens from a position sensor while the power drive signal is at the first power level and prior to the step of transitioning between the first and second power levels.

2. The method according to claim 1, wherein the camera housing is a smartphone.

3. The method according to claim 1, further comprising:
   transitioning the power level of the power drive signal from the second power level to a third power level; and
   obtaining additional position data of a position of the lens from the position sensor while the power drive signal is at the third power level.

4. The method according to claim 1, further comprising:
   calculating power drive signal data of another power drive signal concurrently with the outputting of the power drive signal at the first power level and the obtaining of the position data.

5. The method according to claim 1, further comprising:
   receiving a data ready signal from the gyroscope, the data ready signal indicating that movement data of a movement of the camera housing is ready for processing, the outputting of the power drive signal at the first power level being in response to the data ready signal.

6. A method of driving a lens for movement relative to a camera housing in which the lens is located, the method comprising:
   receiving a plurality of reset signals from a gyroscope that is located in the same housing as the lens, the plurality of reset signals having a first frequency, each of the plurality of reset signals indicating that a gyroscope is in a non-measuring state;
   outputting a power drive signal to drive an actuator that moves the lens, the power of the power drive signal being constant for a first period time, having a transition from one power level to another power level within a single cycle of the power drive signal, and then being constant for a second period of time, the transition being synchronised with a reset signal of the plurality of reset signals; and
   obtaining position data of the lens from a position sensor located adjacent to the lens and in the same housing, the timing of the obtaining of the position data being selected to occur while the power of the power drive signal is at a constant power.

7. The method according to claim 6, wherein the camera housing is a smartphone.

8. The method according to claim 6, further comprising:
   counting the plurality of reset signals; and
   tracking the power drive signal based on the counting of the plurality of reset signals.

9. The method according to claim 6, wherein the power drive signal has a second frequency that is greater than 20 kHz.

10. The method according to claim 6, wherein the power drive signal has a second frequency that is greater than the first frequency.

11. The method according to claim 6, further comprising:
    receiving a data ready signal from the gyroscope, the data ready signal indicating that movement data of the camera housing is ready for processing, the outputting of the power drive signal and the obtaining of the position data being in response to the data ready signal.

12. A method, comprising:
    receiving a reset signal from a gyroscope, the reset signal being active indicating the gyroscope is in a non-measuring state;
    outputting a power drive signal to an actuator, the power drive signal having a transition from one power level to another power level, the transition of the power drive signal being synchronized to be concurrent with the reset signal being active; and
    obtaining position data from a position sensor, the obtaining of the position data being synchronized with the power drive signal to not be during the transition of the power drive signal.

13. The method according to claim 12, further comprising:
    receiving a data ready signal from the gyroscope, the data ready signal indicating that movement data is ready, the obtaining of the position data being in response to the data ready signal.

14. The method according to claim 12, further comprising:
    moving a camera lens based on the power drive signal.

15. The method according to claim 12, wherein the outputting of the power drive signal and the obtaining of the position data are performed concurrently.

* * * * *